US007006610B2

(12) United States Patent  
Schoessow

(10) Patent No.: US 7,006,610 B2  
(45) Date of Patent: Feb. 28, 2006

(54) DOWNLOAD BOOSTER FOR ADSL TRANSMISSION

(75) Inventor: Michael Schoessow, Belmont, CA (US)

(73) Assignee: Symmetricom, Inc., San Jose, CA (US)

( * ) Notice: Subject to any disclaimer, the term of this patent is extended or adjusted under 35 U.S.C. 154(b) by 306 days.

(21) Appl. No.: 10/140,611

(22) Filed: May 7, 2002

(65) Prior Publication Data

US 2003/0007632 A1 Jan. 9, 2003

Related U.S. Application Data

(60) Provisional application No. 60/301,584, filed on Jun. 27, 2001.

(51) Int. Cl.
 *H04M 11/00* (2006.01)
(52) U.S. Cl. .............................. 379/93.05; 379/93.01; 379/399.01
(58) Field of Classification Search .............. 379/93.01, 379/93.05, 399.01, 93.06, 93.08; 375/220, 375/222
 See application file for complete search history.

(56) References Cited

U.S. PATENT DOCUMENTS

| 5,623,543 | A |   | 4/1997  | Cook          |         |
|-----------|---|---|---------|---------------|---------|
| 5,825,819 | A |   | 10/1998 | Cogburn       |         |
| 6,188,669 | B1|   | 2/2001  | Bellenger     |         |
| 6,323,733 | B1|   | 11/2001 | Gorcea et al. |         |
| 6,477,250 | B1| * | 11/2002 | Sheets ........................ | 379/404 |
| 6,738,418 | B1| * | 5/2004  | Stiscia et al. ............... | 375/222 |
| 2003/0063660 | A1| * | 4/2003  | Shenoi et al. ............... | 375/222 |

OTHER PUBLICATIONS

"Symmetricom Extends Broadband Market Focus With Preview of New GoWide Integrated Access Device" as acquired from http://www.symmetricom.com/new/06050_01.html., downloaded on Jun. 5, 2001, Nov. 28, 2001.
International Search Report for PCT/US02/19754 mailed Jun. 19, 2003.

* cited by examiner

*Primary Examiner*—Jefferey F. Harold
(74) *Attorney, Agent, or Firm*—John Bruckner PC

(57) ABSTRACT

Systems and methods are described for a download booster for ADSL transmission. A method includes extending a digital subscriber loop including: coupling a telephone company central office to a customer premises via the digital subscriber loop; filtering a downstream digital subscriber loop signal at the customer premises; and amplifying the downstream digital subscriber loop signal at the customer premises. A method, includes: providing a digital subscriber loop service to a customer premises that is coupled to a telephone central office via a digital subscriber loop line; filtering a downstream digital subscriber loop signal at the customer premises; and amplifying the downstream digital subscriber loop signal at the customer premises. A method, includes extending a digital subscriber loop including: coupling a telephone company central office to a customer premises via the digital subscriber loop; filtering an upstream digital subscriber loop signal at the customer premises; and isolating the upstream digital subscriber loop signal at the customer premises. A method, comprises: providing a digital subscriber loop service to a customer premises that is coupled to a telephone central office via a digital subscriber loop line; filtering an upstream digital subscriber loop signal at the customer premises; and isolating the upstream digital subscriber loop signal at the customer premises. An apparatus includes a download booster coupled to a digital subscriber loop line and a customer premises modem.

4 Claims, 7 Drawing Sheets

COMBINING THE BOOSTER AND ATU-R

FIG. 1. SIMPLIFIED BLOCK DIAGRAM OF AN ALE-R

FIG. 2. CONVENTIONAL ADSL WITH BOTH POTS AND DATA

FIG. 3. CPE SCENARIO WITH BOOSTER AND ATU-R SEPARATE

FIG. 4. COMBINING THE BOOSTER AND ATU-R

SIMPLIFIED BLOCK DIAGRAM OF AN ALE-R

CPE SCENARIO WITH BOOSTER AND ATU-R SEPARATE

COMBINING THE BOOSTER AND ATU-R

DOWNLOAD BOOSTER FOR ADSL TRANSMISSION

CROSS-REFERENCES TO RELATED APPLICATIONS

This application is related to, and claims a benefit of priority under 35 U.S.C. 119(e) and/or 35 U.S.C. 120 from, copending U.S. Ser. No. 60/301,584, filed Jun. 27, 2001, now pending, the entire contents of which are hereby expressly incorporated by reference for all purposes.

BACKGROUND OF THE INVENTION

1. Field of the Invention

The invention relates generally to the field of digital subscriber lines. More particularly, the invention relates to asymmetric digital subscriber lines. Specifically, a preferred implementation of the invention relates to asymmetric digital subscriber lines over long loops.

2. Discussion of the Related Art

Asymmetric Digital Subscriber Line (ADSL) technology provides one of the most efficient and popular methods used for providing connectivity between a subscriber's premises and the Central Office of the serving telephone company. The primary use of ADSL today is for providing subscribers with efficient, always-on, high-speed access to the Internet. Other services, such as telephony, can also be provided over the same digital subscriber line.

Typically, communication between an end-user and an Internet Service Provider (ISP) is characterized by a relatively high bit-rate requirement in the downstream (from ISP to end-user) or download direction, and a relatively low bit-rate requirement in the upstream (from end-user to ISP) or upload direction. ADSL technology was developed to address this need and available services provide an upstream bit-rate typically in the range of 128 kbps to 384 kbps and a downstream bit-rate typically in the range of 384 kbps to 6 Mbps. A typical premium ADSL service provides 256 kbps upstream and 1.5 Mbps downstream.

A problem with this technology has been the decreasing bit-rate capacity of ADSL with increasing loop length. This is primarily because the signal is attenuated to a greater extent with increasing loop length. This attenuation could, in principle, be offset by increasing the transmit signal power. In particular, since the attenuation increases with frequency, the transmit power spectral density could be shaped to ensure greater power at higher frequencies. However, there are regulatory constraints that prevent this arbitrary power spectral shaping. In particular, the transmit power spectral density is constrained to meet a "mask" which limits the signal power at the transmitter (and at any intermediate point in the loop) as a function of frequency.

Additionally, the longer the loop, the greater the possibility of having induced interfering signals from such diverse sources as AM radio broadcasts and from signals present in other loops that share the same binder group (subscriber cable is constructed with several loops, typically 25 pairs, contained in a common sheath or "binder group"). The modems utilize digital signal processing techniques to achieve the digital transmission over the pair of wires constituting the subscriber loop. Thus, inherently, there is an analog-to-digital conversion process and the added quantization noise further, negatively, impacts the supportable bit-rate.

In an attempt to solve the above-discussed problems, one approach has been developed involving improving the transmission bit-rate for long subscriber loops utilizing extenders (often called repeaters), which are placed in the loop plant between the Central Office and the subscriber premises. However, a disadvantage of this approach is the need for additional Central Office equipment.

Another disadvantage of this approach has been relatively high cost. Therefore, what is also needed is a solution that meets the above-discussed requirements in a more cost-effective manner.

Heretofore, the requirements of increasing downstream bit-rates for long ADSL loop lengths utilizing methods and apparatus deployed at the subscriber premises, obviating the need for additional Central Office equipment, eliminating the possibility of spectral mask violations associated with the improper deployment of a mid-span repeater, and eliminating the need for outside plant construction referred to above have not been fully met. What is needed is a solution that addresses this all of these requirements.

SUMMARY OF THE INVENTION

There is a need for the following embodiments. Of course, the invention is not limited to these embodiments.

According to an aspect of the invention, a method comprises: extending a digital subscriber loop including: coupling a telephone company central office to a customer premises via the digital subscriber loop; filtering a downstream digital subscriber loop signal at the customer premises; and amplifying the downstream digital subscriber loop signal at the customer premises. According to another aspect of the invention, a method, comprises: providing a digital subscriber loop service to a customer premises that is coupled to a telephone central office via a digital subscriber loop line; filtering a downstream digital subscriber loop signal at the customer premises; and amplifying the downstream digital subscriber loop signal at the customer premises. According to another aspect of the invention, a method, comprises extending a digital subscriber loop including: coupling a telephone company central office to a customer premises via the digital subscriber loop; filtering an upstream digital subscriber loop signal at the customer premises; and isolating the upstream digital subscriber loop signal at the customer premises. According to another aspect of the invention, a method, comprises: providing a digital subscriber loop service to a customer premises that is coupled to a telephone central office via a digital subscriber loop line; filtering an upstream digital subscriber loop signal at the customer premises; and isolating the upstream digital subscriber loop signal at the customer premises. According to another aspect of the invention, an apparatus comprises: a download booster coupled to a digital subscriber loop line and a customer premises modem.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein like reference numerals (if they occur in more than one view) designate the same elements. The invention may be better understood by reference to one or more of these drawings in combination with the description presented herein. It should be noted that the features illustrated in the drawings are not necessarily drawn to scale.

DESCRIPTION OF PREFERRED EMBODIMENTS

Figure 1:
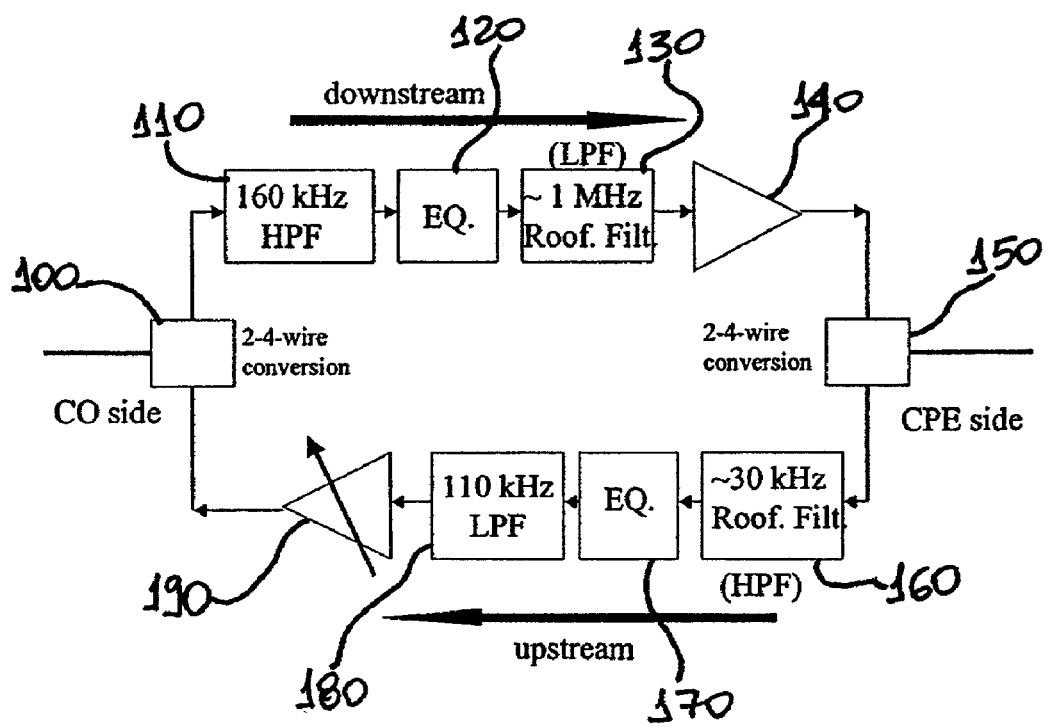
FIG. 1 illustrates a simplified block diagram of an ALE-R, representing an embodiment of the invention.

The invention and the various features and advantageous details thereof are explained more fully with reference to the nonlimiting embodiments that are illustrated in the accompanying drawings and detailed in the following description. Descriptions of well known components and processing techniques are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this detailed description.

The below-referenced U.S. Patent Applications disclose embodiments that were satisfactory for the purposes for which they are intended. The entire contents of U.S. Ser. No. 09/476,770, filed Jan. 3, 2000; U.S. Ser. No. 09/821,841, filed Mar. 28, 2001; U.S. Ser. No. 09/843,161, filed Apr. 25, 2001; U.S. Ser. No. 09/836,889, filed Apr. 16, 2001; U.S. Ser. No. 09/838,575, filed Apr. 18, 2001; U.S. Ser. No. 09/870,380, filed May 29, 2001; U.S. Ser. No. 09/882,288, filed Jun. 14, 2001; and U.S. Ser. No. 60/312,390, filed Aug. 15, 2001 are hereby expressly incorporated by reference herein for all purposes.

The term "download booster" refers to the methods and apparatus deployed at the customer premises in conjunction with the ADSL modem. The apparatus included in the Central Office will be termed "ATU-C", and the apparatus located in the customer premises will be termed "ATU-R". The underlying method of an ADSL extender will be referred to as an "ALE-R". An example of an ALE-R is a product offering from Symmetricom, Inc., San Jose, Calif., under the brand name "GoLong".

The underlying standard for ADSL transmission is often referred to, colloquially, as "G.DMT." Discrete Multi-tone Transmission (DMT) is a technique well suited for transmission media that exhibit a wide range of attenuation over the frequency band of operation such as subscriber loop cable plant. To avoid the necessity of wide-band equalization the DMT scheme divides the channel frequency band into 256 sub-channels comprising approximately 4 kHz wide slots (actually 4.3125 kHz). Over each sub-channel, a 4 kHz wide frequency slot, the frequency response of the cable is essentially a constant and hence the need for equalization is minimal. Each sub-channel is utilized to near channel capacity and the overall bit-rate is the aggregate of the bit-rates of the sub-channels. The sub-channels have implied carrier frequencies that are multiples of 4.3125 kHz (i.4.3125 kHz; the sub-channel is referred to as channel "i") and nominal bandwidths (one-sided) of 4.3125 kHz.

The Shannon Channel Capacity theorem states that for a (one-sided) channel bandwidth of W kHz, and a signal-to-noise ratio of (S/N), a bit-rate which can be supported with a negligible probability of error is given by the expression:

$$B_{max} = 2 \cdot W \cdot \log_2\left(\frac{S}{N}\right) kbps$$

From a practical standpoint, some signal-to-noise ratio margin is required and the actual achievable bit-rate will depend on the modulation and coding techniques applied. Generally speaking, the bit-rate computed using a signal-to-noise ratio margin of 6 dB (essentially using a smaller number for signal-to-noise ratio in the equation) can be achieved with a probability of error of significantly less than 10-7. The signal power, S, is limited by the signal level at the transmitter output. A power spectral density (PSD) mask has been specified in the standards that limits the transmitter output PSD to less than (approximately) −34 dBm/Hz. The signal level at the receiver is then the transmit level attenuated by the frequency response of the cable at the (nominal) frequency of the center frequency of the sub-channel.

The noise power, N, has four principal components. One component is cross-talk, the second is ingress of signals into the cable from sources such as AM radio stations, the third is in the receiver itself from quantization noise introduced by the analog-to-digital converter (ADC), and the fourth is, generically, background noise. The background noise has been empirically determined to have a power spectral density of −XB dBm/Hz. The governing Standards Body, ANSI-T1E1.4, has an agreed upon simulation model for cross-talk and background noise and has provided a framework for estimating bit-rate and/or margin, taking into account particulars of the modulation scheme and coding gain. Ingress of signals from radio stations is often ignored because these tend to be narrowband in nature, difficult to predict and model, and usually affect only a limited number of sub-channels.

The impact of quantization noise introduced by the ADC is implementation specific. For example, the nominal sampling frequency required in the down-stream direction, i.e., in the ATU-R, is 2.2 MHz. Whereas ATU-R units from various manufacturers may all use this sampling rate, the accuracy of the ADC, in terms of number of bits, may vary. Since the cost of high-speed ADCs increases rapidly with increasing word-length, inexpensive ATU-R units may have an analog-to-digital converter of 10 or 12 (effective) bits whereas higher performance ATU-R units may use converters with 14 (effective) bits. The quantization noise introduced by the converter decreases by 6 dB for each additional bit of word-length and thus in the case of inexpensive ATU-R units, the conversion word-length may well be a factor in limiting the bit-rate. Sub-optimal scaling of the signal to the ADC also contributes to a degradation of bit-rate by increasing the deleterious impact of the quantization noise.

Denote by $-X^k$ dBm/Hz the effective noise spectral density in sub-channel designated by index k (the choice of negative sign is intentional, since the typical noise contribution is of the order of −100 dBm/Hz). The signal-to-noise ratio for sub-channel k can be expressed as:

$$SNR_k = -34 + X_k - G_k \text{ dB}$$

where Gk is the attenuation introduced by the cable plant at the center frequency of sub-channel k (we assume that the cable response is essentially flat over the entire sub-channel bandwidth). Clearly, for every 6 dB change in cable attenuation, the channel capacity is reduced by 1 bit per symbol or approximately 8 kbps in bit-rate. The impact of this attenuation is quite dramatic in the downstream direction. For example, at 500 kHz, about the middle of the downstream frequency band, 26-gauge cable introduces attenuation in excess of 5 dB/kft. 24-gauge cable introduces attenuation in excess of 4 dB/kft.

In the absence of cross-talk and ingress, the principal factors limiting capacity are cable loss and ADC quantization noise.

In the frequency division duplex (FDD) mode of operation of ADSL, the frequency band from 30 kHz to 130 kHz is used for upstream transmission and from 130 kHz to 1.1 MHz is used for downstream transmission. In practice a "guard band" is set between the upstream and downstream frequency bands so that practical filtering methods can separate the two directions. The most common ATU-C utilizes the band ranging from (approximately) 160 kHz to 1.1 MHz for the downstream direction (specifically channels i=38 through i=255) and expects the ATU-R to utilize the range between (approximately) 30 kHz to 110 or 120 Hz (specifically channels i=7 through i=29) for the upstream direction.

The principle underlying the Symmetricom extender (an ALE-R, brand name "GoLong") is to compensate for the cable loss introduced. This is achieved by introducing amplification. Different levels of gain are introduced in the upstream and downstream direction to account for the low-pass nature of the loop plant. Sharp cutoff low-pass and high-pass filters are used to separate the directions of transmission. The stop-band attenuation of these filters is designed to provide a substantial gain margin for the purposes of stability.

Referring to FIG. 1, a simplified block diagram of the ALE-R is depicted. A first 2-4-wire conversion element 100 is coupled to a downstream high-pass filter element 110. The downstream high-pass filter element 110 is coupled to a downstream equalizer element 120. The downstream equalizer element 120 is coupled to a downstream roofing filter element 130. The downstream roofing filter element 130 is coupled to a downstream amplifier element 140. The downstream amplifier element 140 is coupled to a second 2-4-wire conversion element 150. The second 2-4-wire conversion element 150 is coupled to an upstream roofing filter element 160. The upstream roof filter element 160 is coupled to an upstream equalizer element 170. The upstream equalizer element 170 is coupled to an upstream low-pass filter element 180. The upstream low-pass filter element 180 is coupled to an upstream variable gain amplifier element 190. The upstream variable gain amplifier element 190 is coupled to the first 2-4-wire conversion element 100.

Still referring to FIG. 1, the downstream high-pass filter element 110 includes a steep band-edge elliptic 10th order 160 kHz high-pass filter, and the upstream low-pass filter element 180 includes an elliptic 9th order 110 kHz low-pass filter. The downstream equalizer element 120 includes an in-band frequency shaping element to establish slopes of ~13 dB/octave in the downstream direction, and the upstream equalizer element 170 includes an in-band frequency shaping element to establish slopes of ~4 dB/octave in the upstream direction.

Referring to FIG. 1, a pair of roofing filters is also employed in both directions, providing frequency response roll off below the upstream band and above the downstream band. Specifically, the downstream roofing filter element 130 includes a 1 MHz low-pass filter, and the upstream roofing filter element 160 includes a 30 kHz high-pass filter.

For convenience, circuitry associated with power, protection, health check, etc., is not shown in FIG. 1. The ALE-R thus comprises an active element that is deployed in the loop plant to boost the signal levels and thus allow for longer reach. Note that the ALE-R is not a regenerator.

The active nature of the ALE-R necessitates the provision of power. With GoLong, a companion unit, the ALE-C, is deployed in the Central Office to provide power to the ALE-R as well as provide a means to check the "health" of the ALE-R in an autonomous manner. Deployment in the outside loop plant implies the (potential) exposure to hazardous voltages such from lightning or power-cross and consequently the need for elaborate protection circuitry. Since the ALE-R is in-line, and in the loop plant, there is a limit to the amplification that can be provided and yet ensure compatibility with the regulatory spectral mask. Deployment of the ALE-R entails physical intervention into the loop plant, referred to in the industry as a "truck roll". Since the unit is span powered, the loop cannot be used for providing simultaneous telephone service or Plain Old Telephone Service (POTS).

Not shown in the block diagram of FIG. 1 is the circuitry associated with powering the ALE-R, the health check, and the upstream AGC. The health check is a patent-pending technique for communicating a status signal back to the Central Office. When appropriate downstream signal strength is detected, a health-check tone (corresponding to either channel i=5 or i=6) is returned in the upstream direction. The upstream AGC is a patent-pending technique to adjust the upstream gain to accommodate a variable length of cable between the ALE-R and the ATU-R.

Figure 2:
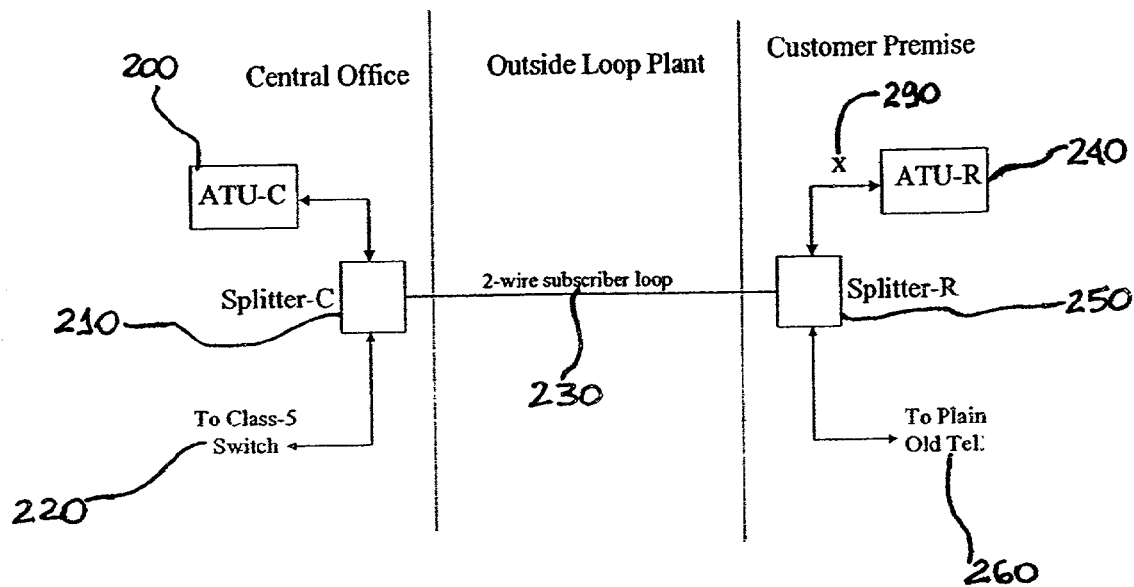
FIG. 2 illustrates a block diagram of a conventional ADSL with both POTS and data, and with a download booster location indicated, representing an embodiment of the invention.

Referring to FIG. 2, a block diagram of a conventional ADSL with both POTS and data with a download booster location indicated is depicted. An ATU-C element 200 is coupled to a splitter-c element 210. A class-5 switch element 220 is coupled to the splitter-c 210. The splitter-c element 210 is coupled to a 2-wire subscriber loop element 230. The 2-wire subscriber loop element 230 is coupled to a splitter-r element 250. An ATU-R element 240 is coupled to the splitter-r element 250. A plain old telephone element 260 is coupled to the splitter-r element 250. A download booster element 290 can be located in between and coupled to the ATU-R element 240, and to the splitter-r element 250.

Still referring to FIG. 2, at the Central Office the data signal from the ATU-C element 200 (the Central Office end modem) and the signal from the class-5 switch element 220 (that supports POTS) are combined at the splitter-c element 210 so that both data and POTS signal coexist on the 2-wire subscriber loop pair element 230. At the customer premises, the splitter-r element 250 allows data signals from the ATU-R element 240 and the plain old telephone element 260 to be separated. Both splitter-c element 210 and splitter-c element 250 are simply cross-over networks that split the low frequency band, occupied by POTS signals, from the high frequency band, occupied by the ADSL data signals. The download booster element 290 can be introduced in the customer premises between the ATU-R element 240 and the splitter-r element 250.

Without the download booster element 290, the configuration depicted in FIG. 2 can provide premium ADSL service (with downstream bit-rate of 1.5 Mbps or greater) only if the length of the loop is less than about 15 kft (of equivalent AWG-26-gauge cable) or approximately 3 miles. The downstream bit-rate drops precipitously with increasing loop length. Sometimes other adverse conditions apply and the maximum supported downstream bit-rate may be less than 1.5 Mbps even for loop lengths less than 12 kft. Downstream bit-rates greater than 1.5 Mbps cannot be reliably supported on loops longer than 15 kft (all lengths in terms of equivalent AWG-26-gauge cable).

By placing an ALE-R (GoLong) such as the one depicted in FIG. 1 at 9 kft from the Central Office, the downstream-1.5Mbps-loop-length is increased, with reliable service possible to as much as 21 kft. Furthermore, the supportable downstream bit-rate with the ALE-R installed is greater than without the ALE-R for all loop lengths (beyond 9 kft).

Surprisingly, better results can be obtained with the introduction of the download booster element 290 instead of an ALE-R. The powering scheme employs local powering and consequently the loop can then support both POTS and data (ADSL). Since the distance from the ALE-R to the ATU-R is known (they are essentially collocated), there is no need to include any elaborate AGC functionality to account for the (unknown) loop length between ALE-R and ATU-R. The constraint of spectral mask is easily met by ensuring that the up-stream gain is less than 0 dB across the entire upstream frequency band. Since the downstream output does not impact other loops, there is no spectral-mask limitation on the amplification provided in the downstream direction. Similarly, there is no spectral-mask limitation on equalization (described in more detail below) provided in the downstream direction.

Figure 3:
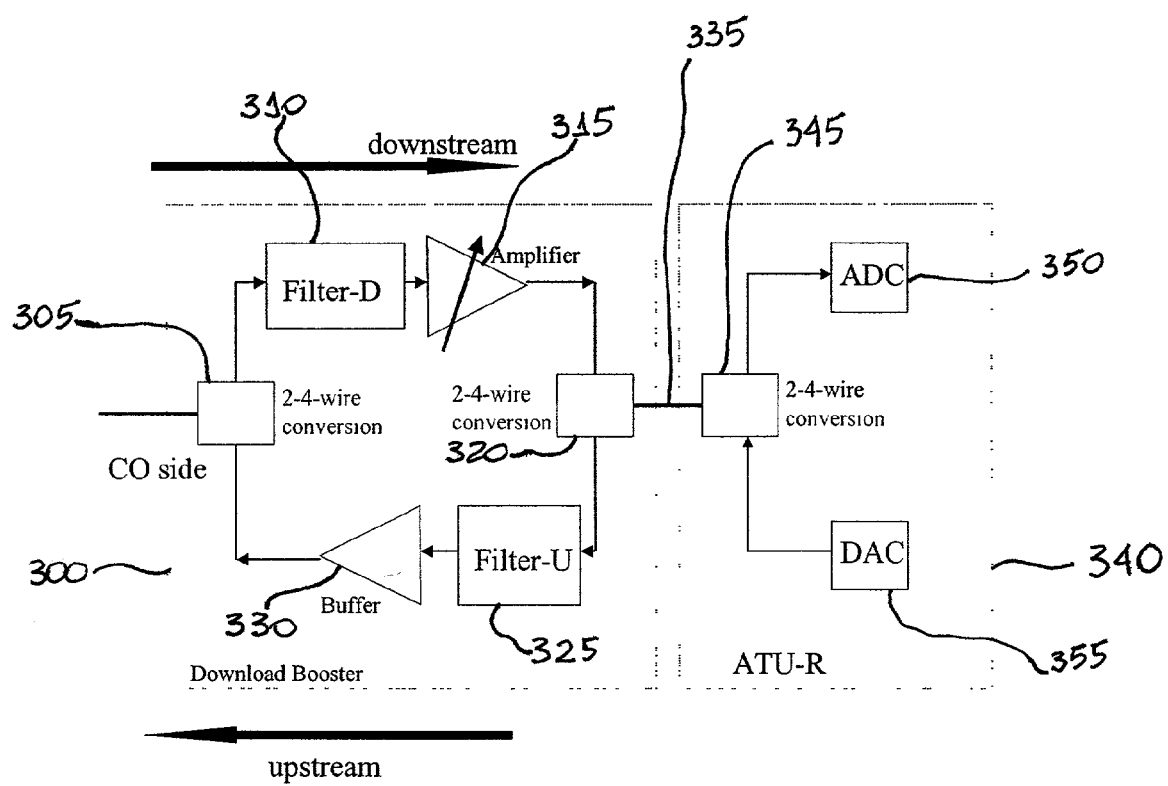
FIG. 3 illustrates a block diagram of a CPE scenario with a download booster and ATU-R separate, representing an embodiment of the invention.

Referring to FIG. 3, a block diagram of a CPE scenario with a download booster and ATU-R separate is depicted. A download booster block 300 is coupled to an ATU-R block via a wire element 335. A first 2-4 wire conversion element 305 is coupled to a filter-d element 310. The filter-d element 310 is coupled to a second 2-4-wire conversion element 320 through variable-gain amplifier 315. The second 2-4-wire conversion element 320 is coupled to a filter-u element 325. The filter-u element 325 is coupled to a buffer element 330. The buffer element 330 is coupled to the first 2-4-wire conversion element 305. The second 2-4-wire conversion element 320 is coupled to a third 2-4-wire conversion element 345 via the wire element 335. The third 2-4-wire conversion element 345 is coupled an ADC element 350. A DAC element 355 is coupled to the third 2-4-wire conversion element 345.

Still referring to FIG. 3, the filter-d element 315 and the filter-u element 325 represent the filtering done in the download booster block 300 in the downstream direction and in the upstream direction, respectively. The buffer 330 can be a unity gain buffer, with a high impedance input and an isolated output, where it duplicates the input signal and isolates it from the output. It may also be designed to give the whole upstream path a unity gain. Other isolation devices may be promptly devised. In the ATU-R block, the ADC element 350 includes the analog-to-digital converter and the anti-aliasing filter and the high-pass filter to separate the upstream and downstream bands. The DAC element 355 includes the digital-to-analog converter, the post-conversion smoothing filter that also helps in separating the upstream and downstream frequency bands.

Referring to FIG. 3, from a band rejection point of view, the ADC element 350 filtering and filter-d element 315 filtering have much the same rejection bands. The ADC element 350 filtering rejection requirements are based on anti-aliasing and attenuation of any upstream signal leakage coming to the ADC element 350, whereas the filter-d element 315 rejection requirements are based on separating the directions as well as ensuring that the closed-loop gain is less than unity at all frequencies to prevent the onset of oscillatory behavior. Similarly, the DAC element 355 filtering and the filter-u element 325 reject the same frequency bands. This observation can be capitalized upon by combining the ATU-R block 340 and the download booster block 300, as depicted in FIG. 4.

Figure 4:
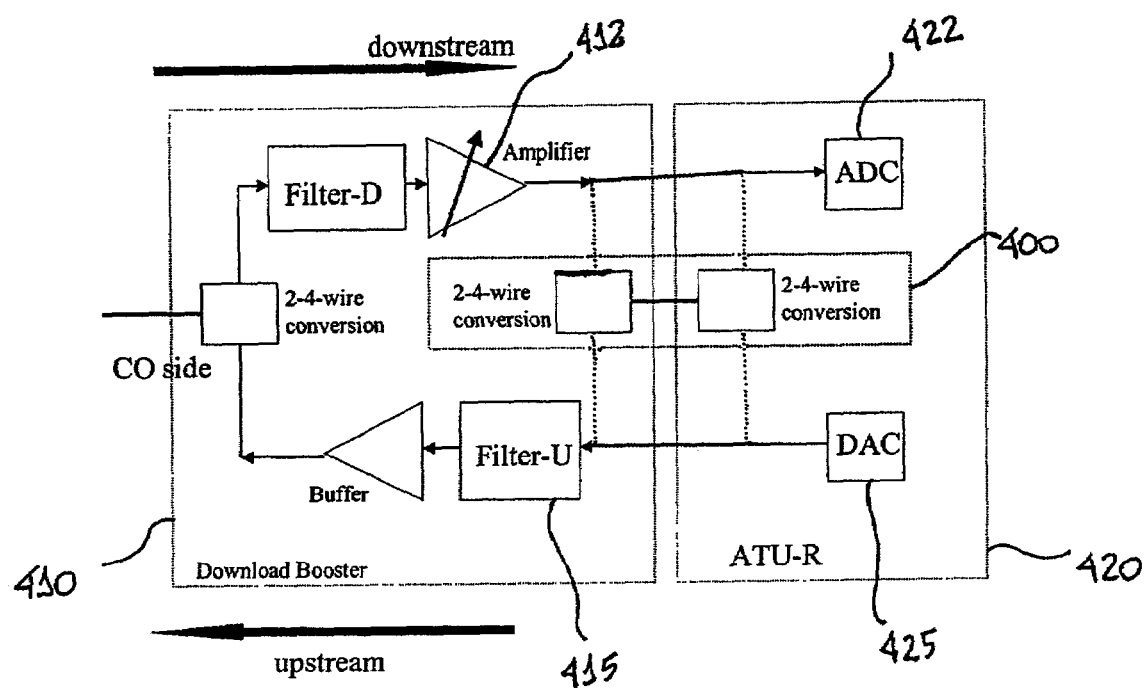
FIG. 4 illustrates a block diagram of a download booster and ATU-R combination, representing an embodiment of the invention.

Referring to FIG. 4, a block diagram of a download booster and ATU-R combination is depicted. Combining the download booster block 410 and the ATU-R block 420 can be viewed in the following manner. Note that there are effectively two back-to-back 2-wire-to-4-wire conversion processes, one in the download booster block 410, and the other in the ATU-R block 420. The redundant circuitry encapsulated by a dotted block 400 can be removed. A variable gain amplifier element 412 can be coupled directly into the ADC element 422 of the ATU-R block 420. Also, the output of the DAC element 425 can be coupled directly to a filter-u element 415.

Still referring to FIG. 4, numerous benefits are obtained from this combination. First, there is the removal of redundant circuitry with the attendant cost reduction. Second, there is no longer a closed loop in the download booster, simplifying the band-reject requirements. Third, the 2-wire-to-4-wire conversion is done by the download booster and will normally be better than that usually implemented in high-volume, low-cost, ADSL modems. Fourth, the band-reject filtering of the two devices appears in series, providing exceptionally good separation of upstream and downstream signals with the attendant reduction of interference.

These benefits can be obtained even if the two devices are separate but with minor modifications to each. Considering that the connectors used on most modems is of the RJ-45 variety, the connectors and associated interconnecting cable will support 4-wire operation. It then becomes a simple switch selection to make the devices operate in either the two-wire or 4-wire mode. In the 2-wire mode, the 2-wire-4-wire conversion circuitry will be active in both devices. In the 4-wire mode, the 2-wire-to-4-wire conversion circuitry of both devices is bypassed.

Figure 5:
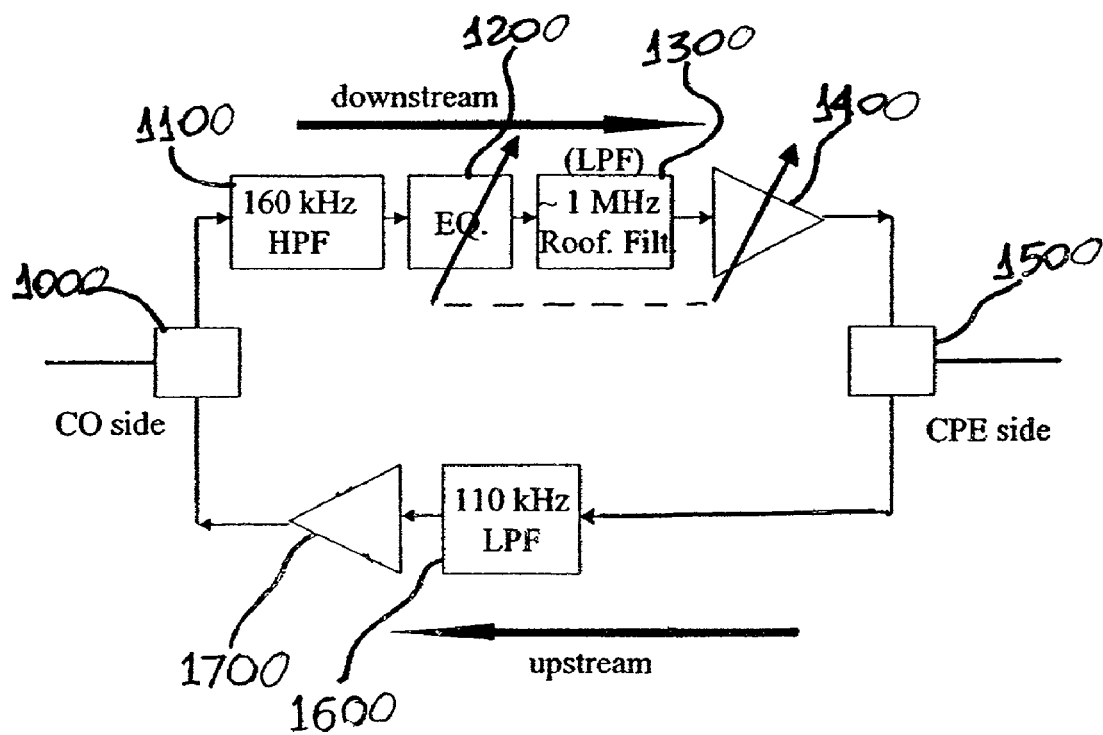
FIG. 5 illustrates another simplified block diagram of an ALE-R, representing an embodiment of the invention.

Referring to FIG. 5, a simplified block diagram of another download booster ALE-R is depicted. A first coupling and impedance matching element 1000 is coupled to a downstream high-pass filter element 1100. The downstream high-pass filter element 1100 is coupled to a downstream variable equalizer element 1200. The downstream variable equalizer element 1200 is coupled to a downstream roofing filter element 1300. The downstream roofing filter element 1300 is coupled to a downstream variable gain amplifier element 1400. In practice these elements are not all discrete, elements 1200, 1300, and 1400 sharing some common circuitry. The downstream variable gain amplifier element 1400 is coupled to a second coupling and impedance matching element 1500. The second coupling and impedance matching element 1500 is coupled to a low-pass filter element 1600. The low-pass filter element 1600 is coupled to an upstream amplifier element 1700. The upstream amplifier element 1700 is coupled to the first coupling and impedance matching element 1000.

Still referring to FIG. 5, the downstream high-pass filter element 1100 includes a steep roll-off 160 kHz high-pass filter, and the upstream low-pass filter element 1600 includes a steep roll-off 110 kHz low-pass filter. These filters serve to prevent oscillation around the loop formed by the up-stream and down-stream circuit paths. The downstream equalizer element 1200 includes a variable in-band frequency shaping element, facilitating down-stream equalization adjustment in tandem with down-stream gain adjustment.

Still referring to FIG. 5, a 1 MHz down-stream roofing filter element 1300 is also employed. For convenience, circuitry associated with power, protection, health check, etc., is not shown in FIG. 5. The download booster ALE-R thus comprises an active element that is deployed in the loop plant to boost the signal levels and thus allow for longer reach. Note that the ALE-R is not a regenerator.

The active nature of the download booster ALE-R necessitates the provision of power. In the case of a stand-alone download booster, power can be supplied from a local wall outlet. In the case of a download booster integrated into a modem, power can be supplied from the modem power supply circuitry.

Not shown in the block diagram of FIG. 5 is the circuitry associated with the downstream AGC (automatic gain control). As noted above with regard to FIG. 1, this uses a technique that is essentially the same as the patent-pending upstream AGC technique employed in the GoLong product. downstream AGC is employed in the download booster to accommodate the variable length of cable between the Central Office and the customer premises.

Figure 6:
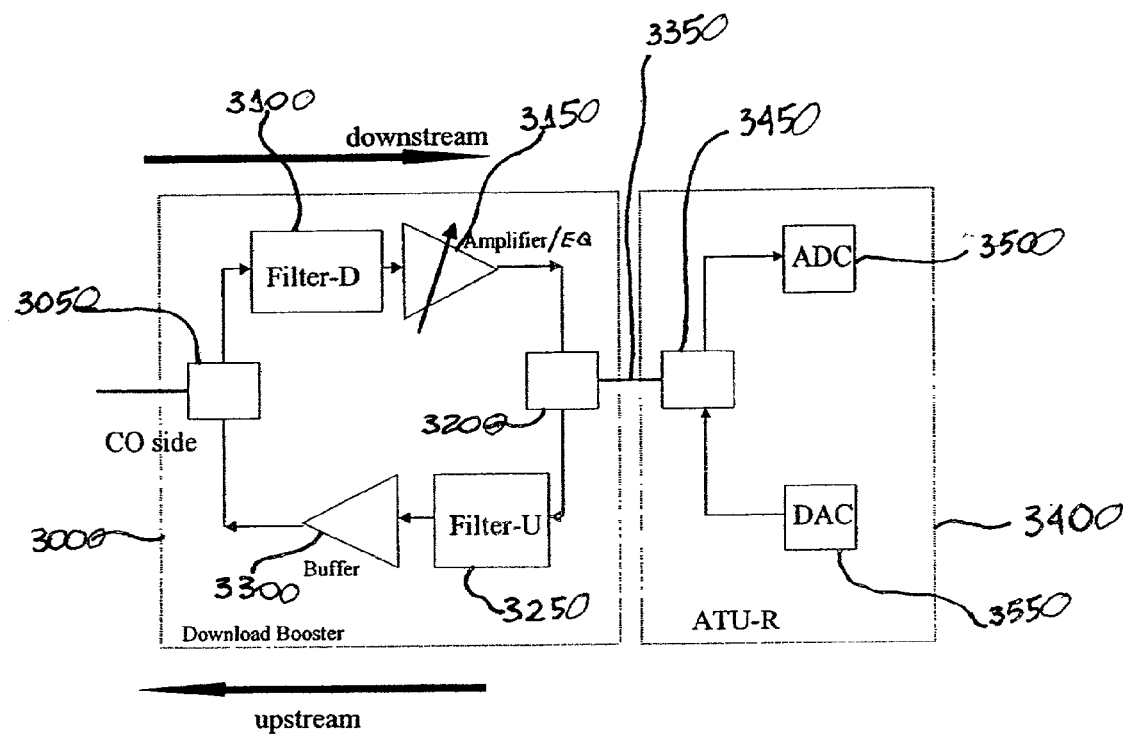
FIG. 6 illustrates another block diagram of a CPE scenario with a download booster and ATU-R separate, representing an embodiment of the invention.

Referring to FIG. 6, a block diagram of a CPE scenario with a download booster and ATU-R separate is depicted. A download booster block 3000 is coupled to an ATU-R block via a wire element 335. (The download booster block 3000 is a simplified representation of the download booster described by FIG. 6.) A first coupling and impedance matching element 3050 is coupled to a filter-D element 3100. The filter-D element 3100 is coupled to an amplifier element 315. The amplifier element is coupled to a second coupling and impedance matching element 3200. The second coupling and impedance matching element 3200 is coupled to a filter-U element 325. The filter-U element 325 is coupled to a buffer element 3300. The buffer element 3300 is coupled to the first coupling and impedance matching element 3050. The second coupling and impedance matching element 3200 is coupled to a third coupling and impedance matching element 345 via the wire element 335. The third coupling and impedance matching element 345 is coupled an ADC element 3500. A DAC element 355 is coupled to the third coupling and impedance matching element 345.

Still referring to FIG. 6, the filter-D element 3100 and the filter-U element 325 represent the filtering done in the download booster block 3000 in the downstream direction and in the upstream direction, respectively. The buffer 3300 can be a unity gain buffer, with a high impedance or matched impedance input and an isolated output, where it duplicates the input signal and isolates it from the output. It may also be designed to give the whole upstream path a unity gain. Other isolation devices may be promptly devised. In the ATU-R block, the ADC element 3500 includes the analog-to-digital converter and the anti-aliasing filter and the high-pass filter to separate the upstream and downstream bands. The DAC element 355 includes the digital-to-analog converter, the post-conversion smoothing filter that also helps in separating the upstream and downstream frequency bands.

Still referring to FIG. 6, from a band rejection point of view, the ADC element 3500 filtering and filter-D element 3100 filtering have much the same rejection bands. The ADC element 3500 filtering rejection requirements are based on anti-aliasing and attenuation of any upstream signal leakage coming to the ADC element 3500, whereas the filter-D element 3100 rejection requirements are based on separating the directions as well as ensuring that the closed-loop gain is less than unity at all frequencies to prevent the onset of oscillatory behavior. Similarly, the DAC element 355 filtering and the filter-U element 325 reject the same frequency bands. This observation can be capitalized upon by combining the ATU-R block 3400 and the download booster block 3000, as depicted in FIG. 7.

Figure 7:
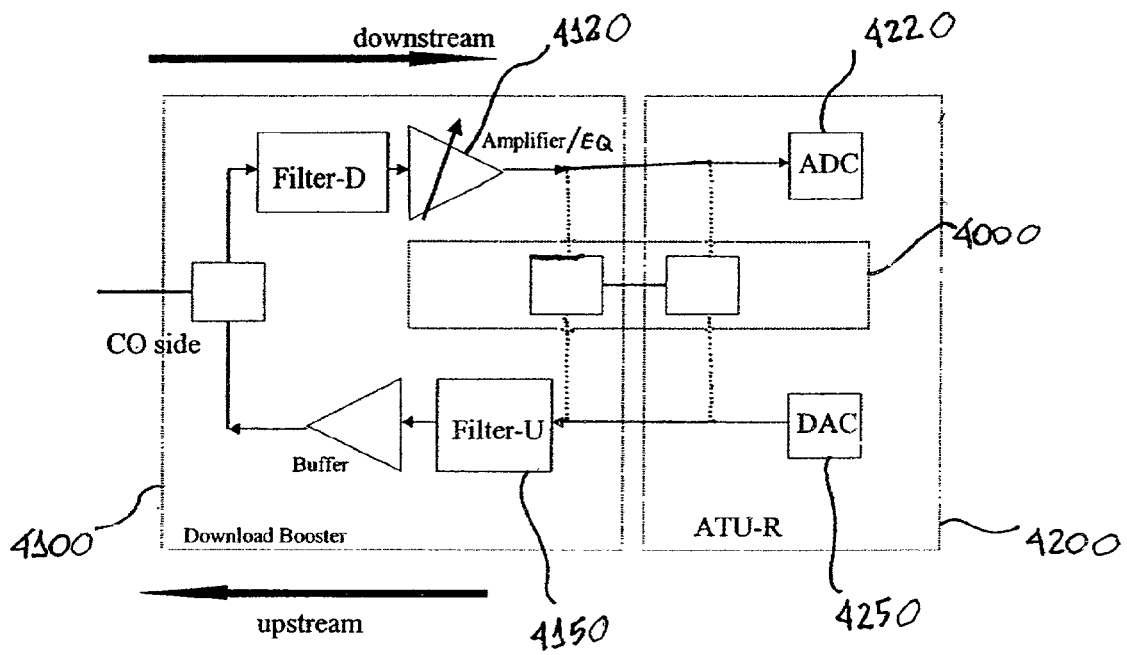
FIG. 7 illustrates another block diagram of a download booster and ATU-R combination, representing an embodiment of the invention.

Referring to FIG. 7, a block diagram of a download booster and ATU-R combination is depicted. Combining the download booster block 4100 and the ATU-R block 4200 can be viewed in the following manner. Note that there are effectively two back-to-back coupling networks, one in the download booster block 4100, and the other in the ATU-R block 4200. The redundant circuitry encapsulated by a dotted block 4000 can be removed. A variable gain amplifier element 412 can be coupled directly into the ADC element 422 of the ATU-R block 4200. Also, the output of the DAC element 425 can be coupled directly to a filter-u element 415.

Still referring to FIG. 7, numerous benefits are obtained from this combination. First, there is the removal of redundant circuitry with the attendant cost reduction. Second, there is no longer a closed loop in the download booster, simplifying the band-reject requirements, thereby relaxing filter requirements in the download booster. Third, the line coupling and impedance matching is done by the download booster and will normally be better than that usually implemented in high-volume, low-cost, ADSL modems. Fourth, the band-reject filtering of the two devices appears in series, providing exceptionally good separation of upstream and downstream signals with the attendant reduction of interference. Fifth, the download booster circuitry may be powered from modem power supply, so a dedicated download booster power supply is no longer required. Most of these benefits can be obtained even if the two devices are separate, but with minor modifications to each.

The download booster provides improvements in bandwidth/data-rate/distance for users of ADSL services. The invention can be located at the customer's location, in-doors next to his or her ADSL modem, rather than mid-span in the outside plant as is the case with GoLong. The invention can boost only downstream data rates; upstream rates will remain essentially unchanged. The invention can support POTS along with ADSL on the same line, and it will do this without the need for additional outside plant lines for either express power or for any additional voice or data support.

The block diagram of the invention differs from that of GoLong in several ways. The power supply circuitry is different because instead of span power, the product can be powered locally from a wall outlet or a modem power supply. There is no need for health-check or diagnostics circuitry. There is no up-stream automatic gain adjusting circuitry; up-stream gain being fixed at approximately unity (0 dB). There are provisions to change the downstream gain and frequency response. This can done either manually via a switching arrangement, or can be an automatic procedure, based upon incoming down-stream signal levels. In the latter case the principles of the circuitry are based upon the design of the GoLong up-stream automatic gain adjusting scheme. The download booster has up-stream and down-stream gain elements, coupling transformers at each end, upstream and downstream filter blocks to prevent oscillation around the loop of amplifiers, and it provides frequency response compensation in the down-stream signal path to compensate for cable roll-off.

The download booster is primarily intended to improve the down-stream performance of ADSL loops that already work but at lower than desirable data-rates. This includes situations where data rate increases are desired for transmitting video or other high bandwidth services, and it includes situations involving loops that are operating at lower than expected data rates (sometimes called "problem loops" in the industry). In the latter case the download booster can provide an inexpensive customer-installed solution that does not require outside plant modifications.

A fundamental advantage of the invention is that it can be installed by the end-user. For example, take the case of an ADSL subscriber who has been provisioned for 1.5 Mbps down-stream and 256 kbps up-stream, but guaranteed only 350 kbps/128 kbps. This person might typically see an actual data rate of 550 kbps/200 kbps. By connecting a download booster between their telephone wall jack and their modem, the downstream data rate can be improved to, say, 850 kbps. The amount of improvement in any particular case will depend upon the details of the loop length, cable character, etc. A second scenario is if, for whatever reason, an ADSL loop fails to qualify at an anticipated acceptable downstream data rate the service provider could send the end-user a download booster to bring their data rate up to specification. A third scenario for this product involves providing sufficient bandwidth boosting on relatively short loops to facilitate a range improvement for "video over ADSL" (video over ADSL is being rolled out today in some areas but presently only reaches out to 6-9Kft from the provider due to downstream bandwidth rolloff; such a service requires roughly 6 Mbps in the downstream direction).

The context of the invention can include digital subscriber lines. The context of the invention can also include asymmetric digital subscriber lines over long loops.

The invention can also be included in a kit. The kit can include some, or all, of the components that compose the invention. The kit can be an in-the-field retrofit kit to improve existing systems that are capable of incorporating the invention. The kit can include software, firmware and/or hardware for carrying out the invention. The kit can also contain instructions for practicing the invention. Unless otherwise specified, the components, software, firmware, hardware and/or instructions of the kit can be the same as those used in the invention.

The term approximately, as used herein, is defined as at least close to a given value (e.g., preferably within 10% of, more preferably within 1% of, and most preferably within 0.1% of). The term substantially, as used herein, is defined as largely, but not necessarily wholly that which is specified. The term coupled, as used herein, is defined as connected, although not necessarily directly, and not necessarily mechanically. The term deploying, as used herein, is defined as designing, building, shipping, installing and/or operating. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system. The phrase any integer derivable therein, as used herein, is defined as an integer between the corresponding numbers recited in the specification, and the phrase any range derivable therein is defined as any range within such corresponding numbers. The terms including and/or having, as used herein, are defined as comprising (i.e., open language). The terms a or an, as used herein, are defined as one or more than one. The term another, as used herein, is defined as at least a second or more.

Practical Applications Of The Invention

A practical application of the invention that has value within the technological arts is to provide a download booster for ADSL transmission. Further, the invention is useful in conjunction with a modem, or in conjunction with a DSL modem, or the like. There are virtually innumerable uses for the invention, all of which need not be detailed here.

Advantages Of The Invention

A download booster for ADSL transmission, representing an embodiment of the invention, can be cost effective and advantageous for at least the following reasons. The invention improves quality and/or reduces costs compared to previous approaches.

All the disclosed embodiments of the invention disclosed herein can be made and used without undue experimentation in light of the disclosure. Although the best mode of carrying out the invention contemplated by the inventor is disclosed, practice of the invention is not limited thereto. Accordingly, it will be appreciated by those skilled in the art that the invention may be practiced otherwise than as specifically described herein.

Further, the individual components need not be formed in the disclosed shapes, or combined in the disclosed configurations, but could be provided in virtually any shapes, and/or combined in virtually any configuration. Further, the individual components need not be fabricated from the disclosed materials, but could be fabricated from virtually any suitable materials.

Further, although the download booster for ADSL transmission described herein can be a separate module, it will be manifest that the download booster for ADSL transmission may be integrated into the system with which it is associated. Furthermore, all the disclosed elements and features of each disclosed embodiment can be combined with, or substituted for, the disclosed elements and features of every other disclosed embodiment except where such elements or features are mutually exclusive.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. A method, comprising extending a digital subscriber loop including:

coupling a telephone company central office to a customer premises via the digital subscriber loop;

filtering a downstream digital subscriber loop signal at the customer premises; and amplifying the downstream digital subscriber loop signal at the customer premises, wherein amplifying the downstream digital subscriber loop signal includes adjusting a gain of the downstream digital subscriber loop signal, wherein adjusting the gain of the downstream digital subscriber loop signal includes independently adjusting a band gain for each of a plurality of frequency bands.

2. A method, comprising:

providing a digital subscriber loop service to a customer premises that is coupled to a telephone central office via a digital subscriber loop line;

filtering a downstream digital subscriber loop signal at the customer premises; and amplifying the downstream digital subscriber loop signal at the customer premises, wherein amplifying the downstream digital subscriber loop signal includes adjusting a gain of the downstream digital subscriber loop signal, wherein adjusting the gain of the downstream digital subscriber loop signal includes independently adjusting a band gain for each of a plurality of frequency bands.

3. A method, comprising extending a digital subscriber loop including:

coupling a telephone company central office to a customer premises via the digital subscriber loop;

filtering an upstream digital subscriber loop signal at the customer premises;

isolating the upstream digital subscriber loop signal at the customer premises; and amplifying a downstream digital subscriber loop signal at a customer premises, wherein amplifying includes independently adjusting a band gain for each of a plurality of frequency bands of the downstream digital subscriber loop signal as a function of an overall gain.

4. A method, comprising extending a digital subscriber loop including:

providing a digital subscriber loop service to a customer premises that is coupled to a telephone central office via a digital subscriber loop line;

filtering an upstream digital subscriber loop signal at the customer premises;

isolating the upstream digital subscriber loop signal at the customer premises; and amplifying a downstream digital subscriber loop signal at a customer premises, wherein amplifying includes independently adjusting a band gain for each of a plurality of frequency bands of the downstream digital subscriber loop signal as a function of an overall gain.

* * * * *